(12) United States Patent
Moon

(10) Patent No.: US 8,072,902 B2
(45) Date of Patent: Dec. 6, 2011

(54) TECHNIQUES FOR DISTRIBUTING DATA AMONG MOBILE NODES BASED ON DYNAMICALLY GENERATED DATA OBJECTS IN A DISTRIBUTED OBJECT-ORIENTED DATABASE

(75) Inventor: Billy Moon, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1178 days.

(21) Appl. No.: 11/500,753

(22) Filed: Aug. 7, 2006

(65) Prior Publication Data
US 2008/0126403 A1 May 29, 2008

(51) Int. Cl.
*H04L 12/28* (2006.01)
*G06F 7/00* (2006.01)
*G06F 17/30* (2006.01)
*H04W 24/00* (2009.01)

(52) U.S. Cl. ..... 370/254; 370/312; 370/393; 455/456.1; 707/790; 707/793; 707/803

(58) Field of Classification Search ......... None
See application file for complete search history.

(56) References Cited

U.S. PATENT DOCUMENTS

| | | | |
|---|---|---|---|
| 5,517,618 A | | 5/1996 | Wada et al. |
| 5,634,010 A | * | 5/1997 | Ciscon et al. ......... 709/223 |
| 5,941,955 A | | 8/1999 | Wilby et al. |
| 6,172,986 B1 | | 1/2001 | Watanuki et al. |
| 6,327,594 B1 | | 12/2001 | Van Huben et al. |
| 6,377,793 B1 | | 4/2002 | Jenkins |
| 6,480,713 B2 | | 11/2002 | Jenkins |
| 6,490,460 B1 | | 12/2002 | Soliman |
| 6,542,925 B2 | | 4/2003 | Brown et al. |
| 6,587,882 B1 | | 7/2003 | Inoue et al. |
| 6,665,677 B1 | | 12/2003 | Wotring et al. |
| 6,681,107 B2 | | 1/2004 | Jenkins |

(Continued)

OTHER PUBLICATIONS

Johnson et al., "Mobility Support in IPv6", draft-ietf-mobileip-ipv6-24.txt, Internet Draft, IETF Mobile IP Working Group, [online], Jun. 30, 2003, [retrieved on Aug. 2, 2007]. Retrieved from the Internet: <URL: http://www.iet.org/internetdrafts/draft-ietf-mobileip-ipv6-24.txt>, pp. 1-172.

(Continued)

*Primary Examiner* — Gregory Sefcheck
*Assistant Examiner* — Salvador E Rivas
(74) *Attorney, Agent, or Firm* — Leon R. Turkevich

(57) ABSTRACT

Techniques for managing data distributed over nodes in a network include receiving, at an original node, content data that describes a physical entity that is not a router in a vicinity of the original node. In response to receiving the content, a beacon data object is generated in an object-oriented database distributed over the network nodes. The beacon holds the content data and holds policy data that indicates how to terminate the beacon. A node that has ownership of the beacon performs the step of terminating the beacon based on the policy data. Ownership of the beacon can be transferred so that the beacon stays associated with the physical entity, such as a room in a building, even as a mobile original node moves away from the physical entity. The content data can indicate conditions that invite responsive action, such as hazardous environmental conditions.

44 Claims, 7 Drawing Sheets

U.S. PATENT DOCUMENTS

| | | | |
|---|---|---|---|
| 6,748,233 B1 * | 6/2004 | Arnold et al. | 455/522 |
| 6,763,013 B2 | 7/2004 | Kennedy | |
| 6,763,014 B2 | 7/2004 | Kennedy | |
| 6,765,892 B1 | 7/2004 | Leung et al. | |
| 7,085,576 B2 | 8/2006 | Ranganathan | |
| 7,130,773 B1 * | 10/2006 | Wong | 702/189 |
| 7,363,024 B2 | 4/2008 | Jenkins | |
| 7,519,733 B1 | 4/2009 | Thubert et al. | |
| 7,549,145 B2 | 6/2009 | Aguilar et al. | |
| 2003/0129995 A1 | 7/2003 | Niwa et al. | |
| 2004/0014567 A1 | 1/2004 | Mendel | |
| 2004/0024886 A1 | 2/2004 | Saxena | |
| 2004/0030571 A1 | 2/2004 | Solomon | |
| 2004/0057409 A1 | 3/2004 | Kennedy | |
| 2004/0134336 A1 | 7/2004 | Solomon | |
| 2004/0139049 A1 | 7/2004 | Hancock et al. | |
| 2004/0192352 A1 | 9/2004 | Vallstrom et al. | |
| 2004/0252027 A1 * | 12/2004 | Torkkola et al. | 340/576 |
| 2005/0060365 A1 | 3/2005 | Robinson et al. | |
| 2005/0068169 A1 | 3/2005 | Copley et al. | |
| 2005/0076054 A1 * | 4/2005 | Moon et al. | 707/103 Y |
| 2005/0106941 A1 * | 5/2005 | Witchey | 439/620 |
| 2005/0256635 A1 * | 11/2005 | Gardner et al. | 701/201 |
| 2006/0025154 A1 | 2/2006 | Alapuranen et al. | |
| 2006/0188327 A1 | 8/2006 | Moon et al. | |
| 2007/0086425 A1 * | 4/2007 | Leow et al. | 370/350 |

OTHER PUBLICATIONS

Object Management Group, "OMG Unified Modeling Language Specification", Version 1.5, Mar. 2003, [online], [retrieved on Sep. 20, 2003]. Retrieved from the Internet: <URL: http://www.omg.org/docs/formal/03-03-01.pdf>, pp. 1-736.

Burden, "Routing the Internet", [online], Jan. 17, 1999, [retrieved Apr. 11, 2006]. Retrieved from the Internet: <URL: www.scit.wlv.ac.uk/jphb/comms/iproute.html>, pp. 1-8.

Sibley et al., "Robomote: A Tiny Robot Platform for large-Scale Ad-Hoc Sensor Networks", May, 2002, Proceedings of the 2002 IEEE International Conference on Robotics and Automation, pp. 1143-1148.

Affens, Nasa, "Emergency Beacon Development", Feb. 28, 2006, [online], [retrieved on Nov. 4, 2009]. Retrieved from the Internet: <URL: http://www.archive.org/web/20060623055831/http://searcjandrescue.gsfc.nasa.gov/techdevelopment/beacons.htm>, pp. 1-2.

Day et al., "A Model for Presence and Instant Messaging", RFC 2778, IETF Network Working Group, [online],Feb. 2000, [retrieved on Nov. 12, 2009]. Retrieved from the Internet: <URL: http://tools.ietf.org/pdf/rfc2778.pdf>, pp. 1-17.

* cited by examiner

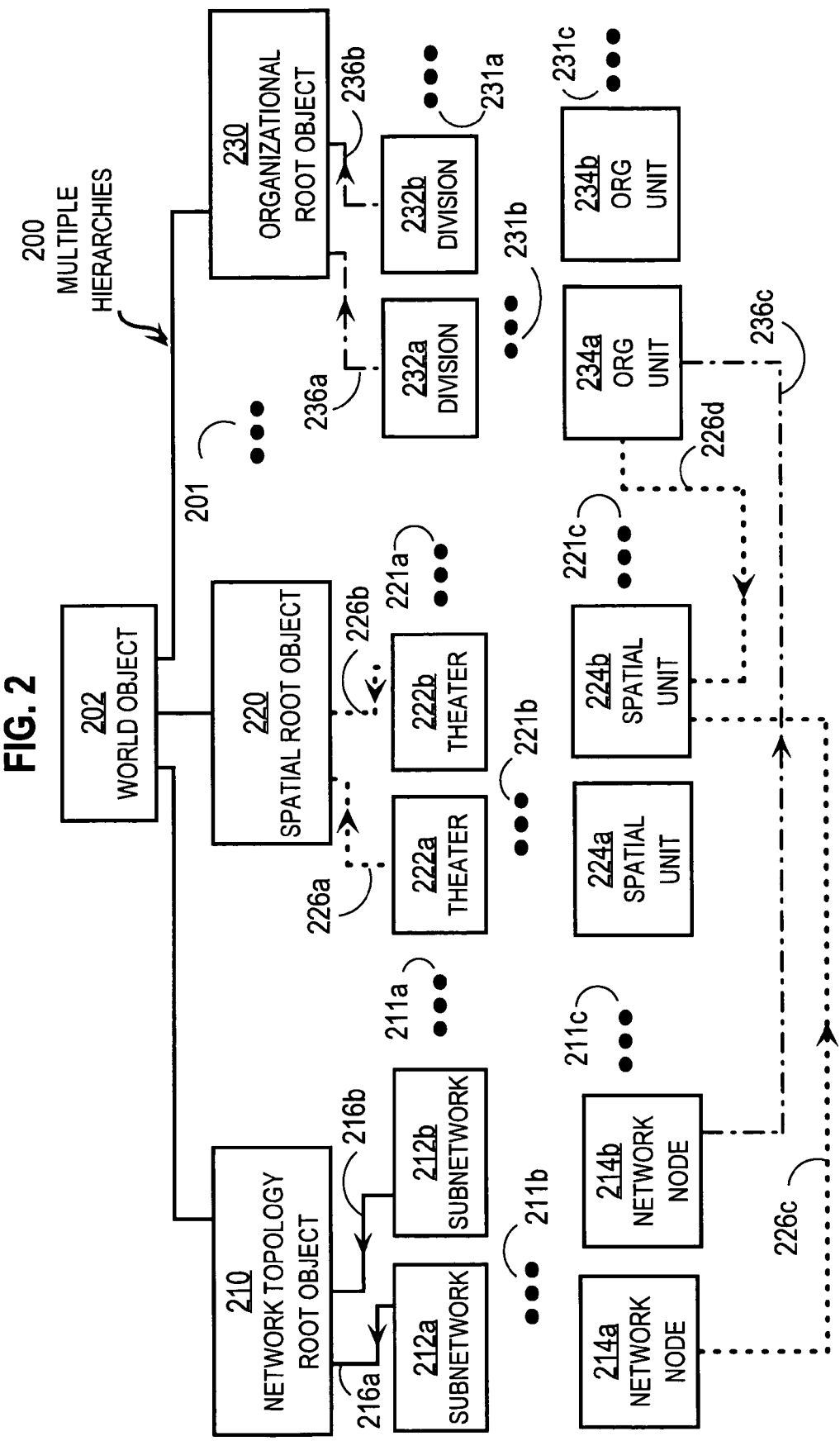

TECHNIQUES FOR DISTRIBUTING DATA AMONG MOBILE NODES BASED ON DYNAMICALLY GENERATED DATA OBJECTS IN A DISTRIBUTED OBJECT-ORIENTED DATABASE

BACKGROUND OF THE INVENTION

1. Field of the Invention

The present invention relates to using nodes to manage, in a distributed object-oriented database, non-routing information generated dynamically at a mobile network node.

2. Description of the Related Art

Networks of general-purpose computer systems and special purpose devices connected by external communication links are well known and widely used in commerce. The networks often include one or more network devices that facilitate the passage of information between the computer systems and special devices. A network node is a network device or computer system or special device connected by the communication links. An "end node" is a node that is configured to originate or terminate communications over the network. An "intermediate network node" facilitates the passage of data between end nodes.

Communications between nodes are typically effected by exchanging discrete packets of data. Information is exchanged within data packets according to one or more of many well known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different layer of detail for information exchange. The protocol in the payload is said to be encapsulated in the protocol of the header. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The internetwork header provides information defining the source and destination address within the computer network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header.

Routers and switches are network devices that determine which communication link or links to employ to support the progress of data packets through the network. A network node that determines which links to employ based on information in the internetwork header (layer 3) and knowledge of at least a portion of the network topology is called a router. Some protocols pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications.

A link-state protocol is an example of a "routing protocol," which only exchanges control plane messages used for routing data packets sent in a different "routed protocol" (e.g., IP). A link-state method floods routing information to all nodes on the internetwork in a link-state protocol control plane data packet; however, each router sends only the portion of the routing information that describes the state of its own links. Link-state data indicates direct links between a network node that performs routing functions (a router) and a different router (e.g., links on the same network segment, which does not involve a third router). The link-state data also indicates other characteristics of those links, such as bandwidth and congestion. According to link-state methods, each router builds a topology model of the connections in the entire network in its routing tables based on the link-state data received from other routers. Routing decisions are based on the topology model of connections throughout the network.

User data includes other data routed between end nodes on a network. Digital files and databases of user data at end nodes are well known and widely used. Distributed systems of user data take advantage of the multiplicity of nodes in a network to distribute storage, processing and communication loads among different end nodes. Distributed systems are well known and widely used on various networks. For example, the World Wide Web distributes files of user data, called pages, over multiple end nodes on the public Internet. Many distributed systems, including the World Wide Web, electronic mail (e-mail) and file transfer protocol (FTP), are built on the client-server model for interaction among multiple processes executing on one or more nodes.

Some distributed systems do not rely on a client request and server response, but instead automatically send information to certain nodes without waiting for a request. An example of such a distributed system is a broadcast or subscription service. These systems are similar to radio and television broadcasts or newspaper home delivery. A subscriber signs up for the service and then a publisher/broadcaster sends information at times determined by the publisher/broadcaster, such as when the publisher/broadcaster produces the data. For example, the Really Simple Syndication (RSS) service (also known as the Rich Site Summary) sends new web page content to subscribers when a particular World Wide Web page changes. RSS uses a particular format so the information can be inserted in an existing copy of a World Wide Web page stored on the subscriber's node. Whereas the client-server model is a "pull" of information, the subscription services provide a "push" of information.

In emerging network systems, network nodes, both intermediate network nodes and end nodes, are not fixed assets in a building or campus, but, instead, include mobile network nodes that are deployed as moving assets on mobile users, such as persons, animals, robots, vehicles and earth-orbiting satellites. In such systems, topology models of current communication links are not sufficient to make decisions on how and where to route information managed by the network.

Information on the spatial arrangement of nodes and users of those nodes becomes important, and may even affect the routes taken to distribute data. It is often desirable that the data pulled by a client or pushed by a publisher depend on the spatial relationship between the user of the mobile node and other users, nodes or data items in the distributed system.

For example, mobile ad hoc networks (MANets) involve mobile wireless routers that network with other fixed or mobile wireless routers with which they come into transmission range. The mobile routers can be carried by humans, animals or vehicles, including robots and earth-orbiting satellites, to interface multiple electronic devices also carried. MANets have applications in tactical police and military and emergency medical services scenarios, including Search and Rescue and other responses to environment-damaging accidents, terrorist attacks and natural disasters, among others. The mobile routers feed information to various control interfaces for the vehicles or various display elements for a human user or stimuli for animals. The routers also receive and transmit to the network information from various sensors or input devices operated by the user, such as the person, an animal or the vehicle. The MANets allow different units to share more information more quickly so that the multiple units can proceed as a coordinated whole. Many network nodes have position information available, such as a location from the Global Positioning System (GPS) widely known and used in commerce, or location from a local triangulation system using three or more electromagnetic wave beacons or acoustic beacons.

In an example scenario, a rescue worker must proceed into a multi-chambered cave to search for a missing human victim. The worker is transported with multiple robots to the site by a large vehicle. The large vehicle has a wide area network connection to a data center with a geographic information system (GIS) that include a map of the cavern chambers. The robots carry end nodes and wireless routers and the end nodes are programmed to operate the robots in order to maintain MANet connectivity between the vehicle and the worker as the worker winds through the cavern.

At first all the robots and the worker are in an overlapping area of wireless coverage. Full network connectivity and adjacency among all robots and the worker consumes network resources, is temporary and is unneeded. Instead, it is preferable that the robots form a line from the large vehicle to the worker based on spatial positions of the large vehicle and the worker. The topographic adjacency of each wireless router is then only established between the spatially preceding and spatially following robots near the limit of the range. Thus routing information depends on location information.

As the worker moves into the cavern, the robots increase their separation based on the spatial information to maintain wireless MANet communications in series from the worker to the large vehicle. Thus, information communicated to the intermediate node for the user is preferably based on location data. If necessary, one or more routers are reconfigured to use increased power to keep a router on an adjacent robot in range. Thus, intermediate node configuration is preferably based on location data.

The information the worker wants communicated over this robot-assisted network from the GIS depends on where the worker is located. If the location of the worker and the worker's heading (orientation) is communicated by the worker's end node to a GIS client, then it is preferable that the GIS client somewhere on the network request from the GIS what is ahead of the worker. Thus the non-routing information to be communicated over the network is preferably based on worker location and heading data.

Other spatial information, such as size and shape, is also useful in communicating data over a network. For example, if the large vehicle is bigger than the cave mouth, then it is not desirable to position the large vehicle in the cave entrance to support network communications with the worker. A desirable proximity of the location of the center of mass of the large vehicle to the position of the center of the cave mouth depends on the size and shape of the large vehicle and the size and the shape of the cave mouth.

As another example, it is noted that many buildings are currently equipped with multiple access points for wireless network communication links. If a mobile node using the access point requests information about the building, the response is preferably based on the user's location and not the location of the access point. For example, if the user is located on a floor above the access point, a request for a restroom or fire extinguisher location is better answered with directions to a restroom or fire extinguisher on the same floor as the user and not with directions to a restroom or fire extinguisher on the same floor as the access point.

In some approaches, location data available from a network node is used to select and configure a network node by changing, for example the power and frequency used for one or more wireless communication links. See, for example, H. Arnold et al., U.S. Pat. No. 6,748,233, Jun. 8, 2004 and R. Kennedy, U.S. Pat. Nos. 6,763,013, and 6,763,014, Jul. 13, 2004. Time series of location data is used to predict present and future advantageous nodes and configurations to maintain connectivity.

In another approach, vehicles carrying mobile nodes are moved to establish or preserve node adjacencies that support desirable routing. See Billy Moon et al., "Arrangement For Autonomous Mobile Network Nodes To Organize A Wireless Mobile Network Based On Detected Physical And Logical Changes," U.S. patent application Ser. No. 10/679,319, filed on Oct. 7, 2003 and published Apr. 7, 2005 as US Published Patent Application Publication No. 20050076054, the entire contents of which are hereby incorporated by reference as if fully set forth herein.

Spatial information available from mobile nodes also can be used to select the non-routing data to be delivered over the wireless communication link. As used here, spatial information includes physical location information or physical shape information or physical size information or physical orientation information, or some combination. For example, a dynamic network system could automatically send the appropriate cave information to the rescue worker or provide the data of the correct building floor to the office worker.

Temporary objects (also called beacon objects) also can be used in an object-oriented database. The beacon objects could include a lifetime attribute and a state attribute. The state attribute could hold data that indicates any information that a user of a mobile node desires to associate with a physical entity represented by a spatial object in a spatial hierarchy of the object-oriented database. For example, the state attribute could hold data that indicates a room in the example cave has been searched and found clear. By default, the objects are owned by a mobile node that creates them; yet they describe the physical entity represented by the spatial object. As the mobile node that owns the beacon moves away from the physical entity represented by the spatial object, the mobile node might lose its association with the spatial object. Thus the mobile node's beacon object might lose its association with the spatial object and be rendered useless to subsequent mobile nodes that come into the vicinity of the physical entity represented by the spatial object. Furthermore, a user of a mobile node may want to generate information about a physical entity that is moving, such as a user of another mobile node or a target of a search, which target does not have a mobile node of the network. Furthermore, a user of mobile node may want to generate persistent information that does not expire for some physical entity.

Based on the foregoing, there is a clear need for techniques to keep a beacon object associated with a spatial object that did not create the beacon object.

Based on the foregoing, there is also a clear need for techniques to associate a beacon object with a physical entity that is moving.

Based on the foregoing, there is also a clear need for techniques to associate a physical entity with a beacon object that persists indefinitely.

The approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a block diagram that illustrates multiple hierarchies that relate objects in the distributed database, according to an embodiment;

DETAILED DESCRIPTION

A method and apparatus are described for distributing non-routing data generated dynamically by a mobile node. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

For purposes of illustration, embodiments of the invention are described in the context of a MANet used by a rescue force, but the invention is not limited to this context. In other contexts, other networks, including stationary wireless access points for mobile nodes and cellular telephone networks, apply techniques of the present invention to support the same or different services.

1. Structural Overview

Figure 1A:
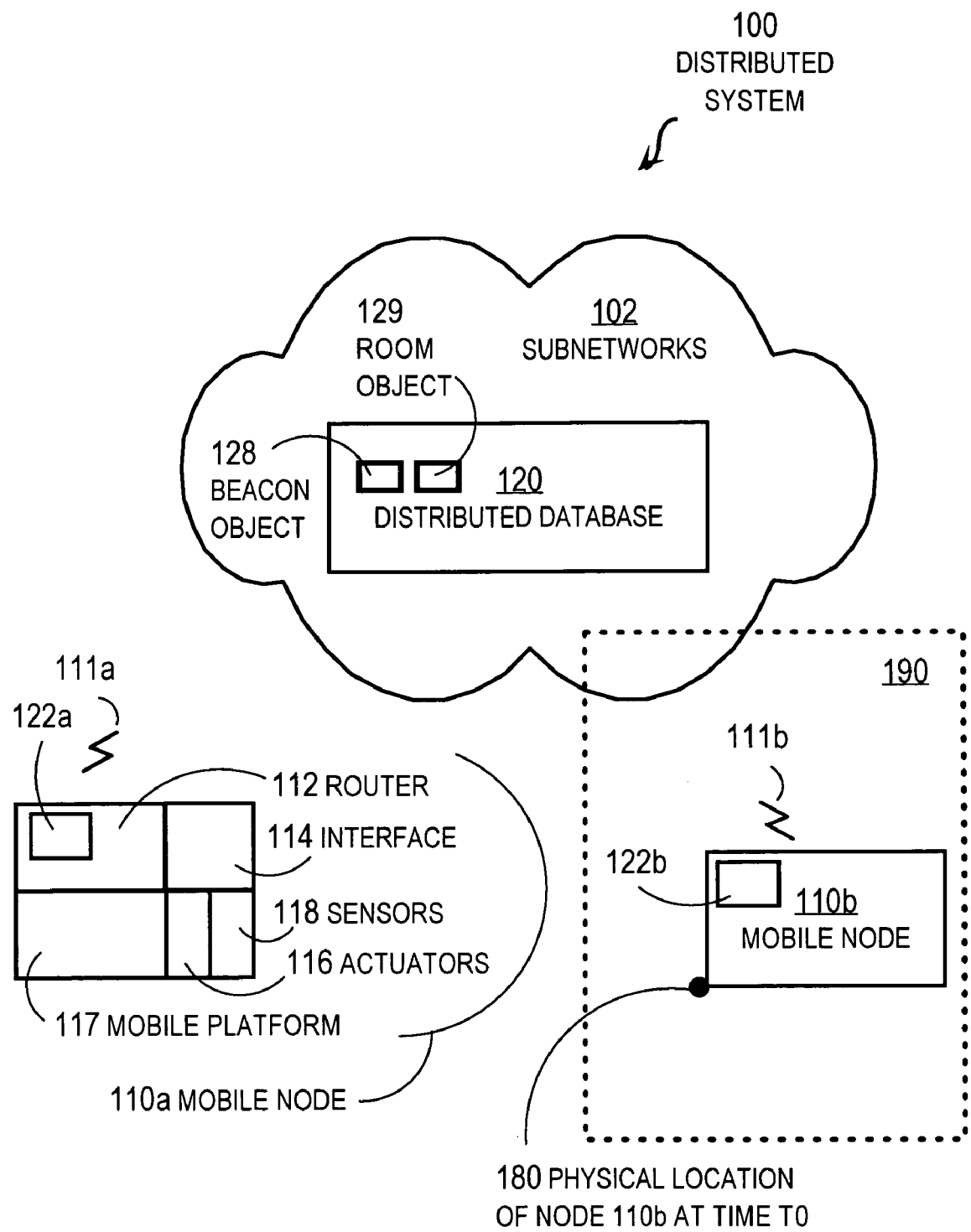
FIG. 1A is a block diagram that illustrates a database distributed among multiple mobile nodes at a first time, according to an embodiment.

FIG. 1A is a block diagram that illustrates a database distributed among multiple mobile nodes at a first time, according to an embodiment. The distributed system 100 includes one or more subnetworks 102, including or connected to one or more network nodes (e.g., mobile network nodes 110a, 110b, collectively referenced hereinafter as mobile nodes 110). The network nodes include both stationary and wireless intermediate network nodes and stationary and wireless end nodes. The subnetworks 102 include any network that connects network nodes, including, but not limited to, local area networks (LANs), wireless networks, wide-area networks (WAN), the Internet (a network of heterogeneous networks using the Internet Protocol, IP), and virtual private networks. For the purposes of illustration, two mobile nodes 110 are shown connected to subnetworks 102 in FIG. 1A. In other embodiments more or fewer network nodes are included in system 100.

Each mobile node, such as mobile node 110a, includes a computer system configured as a router 112, and a local area network that connects a mobile platform 117, actuators 116, an interface 114, and zero or more sensors 118. In some embodiments the mobile platform 117 is a human or animal that carries the mobile node. In some embodiments, the mobile platform is a vehicle or robot. The sensors 118 are devices that respond to external conditions in the vicinity of the router, such as a temperature sensor, a digital cameras, a keyboards pressed by a human in the vicinity, including a human serving as the mobile platform 117. The actuators 116 are one or more computer controlled devices that influences the mobile platform 117 to move, such as a servo motor to move an accelerator or brake, or a stimulus to incite an animal to move or stop, or a heads up display in a helmet to convey instructions to a human acting as the mobile platform 117. The actuators 116 include any computer controlled device that influences a sensor 118 to make a measurement. The interface 114 converts instructions by router 112 into signals used to control the actuators 116 and receive data from the sensors 118.

For example, a rescue worker carries a personal router 112 connected by one or more network segments to a wearable computer, a digital camera, a controller for an ear-piece and heads-up display, and a global positioning system (GPS) as the end nodes (not shown). In other embodiments, more or fewer users carry more or fewer network nodes The system 100 includes a distributed database 120 with multiple data items and processes called objects in an object-oriented system, which objects are distributed among multiple nodes in and connected to the subnetworks 102. In the illustrated embodiments, mobile node 110a includes a portion 122a of the distributed database and mobile node 110b includes a portion 122b of the distributed database.

For purposes of illustration, mobile end node 110a is carried by a medic and communicates by a wireless link 111a with an intermediate network node (not shown) in subnetwork 102. Also for purposes of illustration, mobile node 110b is carried by a fireman and communicates by a wireless link 111b with an intermediate network node (not shown) which serves as a wireless access point in a room 190 of a building.

According to an embodiment of the invention, at the time the mobile node 110b is at physical location 180 in the vicinity of the room 190, non-routing data describing the room 190, a physical entity, is generated by mobile node 110b and stored in a beacon object 128 of the distributed database 120. The beacon object has a particular life cycle determined by the mobile node 110b that generated the beacon object 128. Ownership of beacon object 128 is transferred to a node in subnetworks 102 that can maintain an association of the beacon object 128 with a data object (e.g., room object 129) associated with the physical entity, (e.g., room 190). The beacon object 128 is maintained by the node than has ownership, until it is terminated according to the particular life cycle. For example, non-routing data describing the room 190 in the beacon object 128 includes data that indicates the physical location 180 of the mobile node at the time the beacon object was generated and data that indicates a victim requiring medical aide is located in the room and a digital image of the victim in the room 19 taken by a digital camera on mobile node 110b.

Figure 1B:
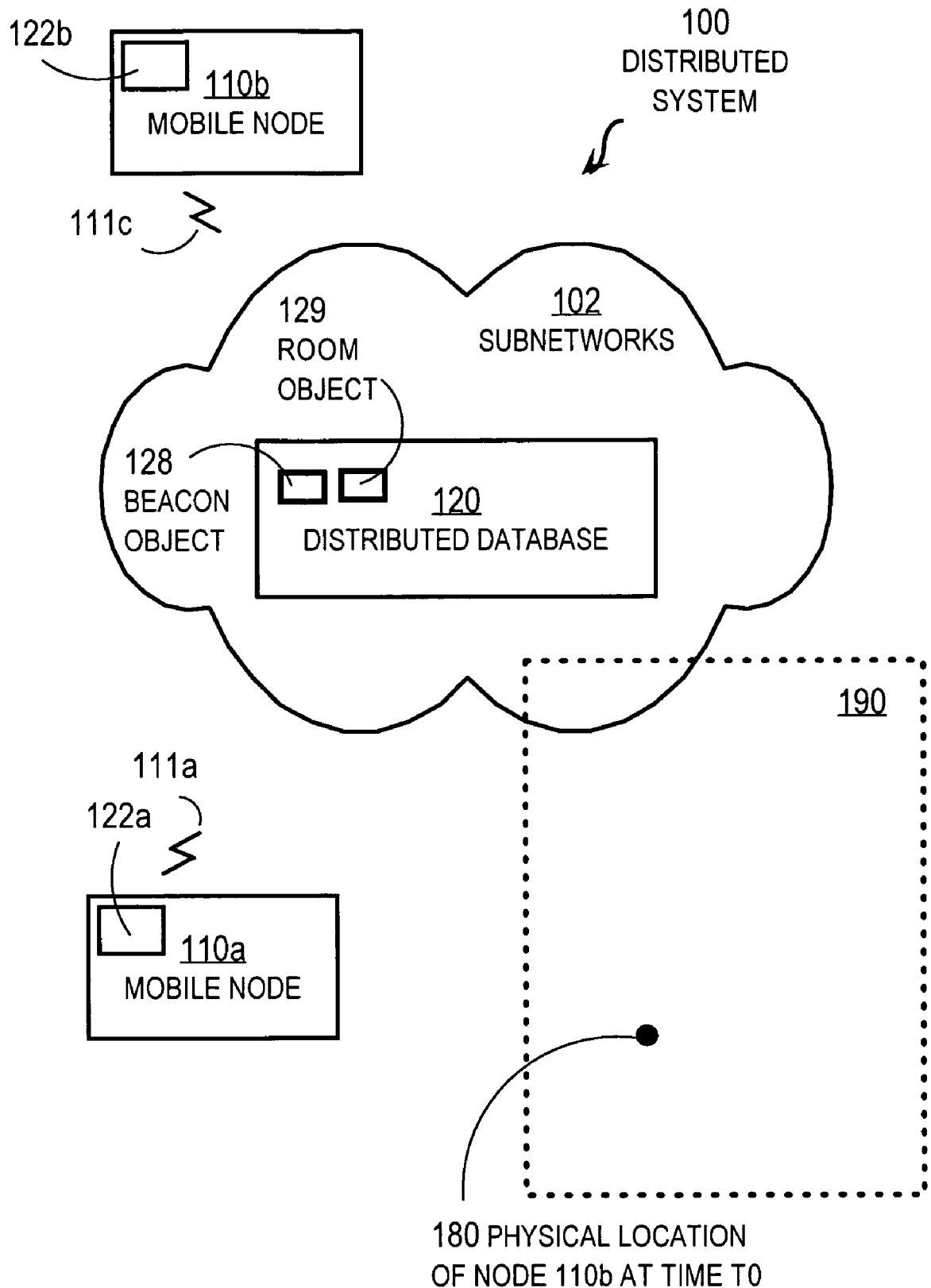
FIG. 1B is a block diagram that illustrates a database distributed among multiple mobile nodes at a later time, according to an embodiment.

FIG. 1B is a block diagram that illustrates the database distributed among multiple mobile nodes at a later time, according to an embodiment. All items are as described in FIG. 1A. The only difference at the later time is that mobile node 110b has moved. Mobile node 110a has stayed in a staging area. Mobile node 110b has moved out of room 190 and now communicates through wireless link 111c with a different intermediate network node (not shown).

According to an embodiment of the invention, the mobile node 110a is alerted that a beacon object of interest to node 110a is relevant. For example, mobile node 110a has indicated an interest in all victims requiring medical attention within two miles of the staging area. After receiving the alert, the mobile node 110a requests the non-routing data from the beacon. In response to the request, the non-routing data is forwarded from the original or a copy of the beacon object 128 to the mobile node 110a. For example, the mobile node 110a receives information from beacon object 128 that a victim requiring medical attention is in room 190 and a digital image of the victim in the room. Additional information about room 190 can be obtained by broadcast or request from the room object 129 in the distributed database Note that, according to this embodiment, it is not necessary that the mobile node 110b that generated the beacon be in the vicinity of the room 190 or mobile node 110a.

2. Multiple Hierarchies of Data Objects

Data objects are well known and widely used in object-oriented systems. A data object is a collection of data that represents one or more attributes and methods for operating on those attributes. See for example, Scott W. Ambler, *The Object Primer: The Application Developer's guide to Object-orientation*, University of Cambridge Press, Cambridge, United Kingdom, 248pp, 1998, the entire contents of which are hereby incorporated by reference as if fully set forth herein. Objects are often formed as instances of a class of objects that share certain characteristics, such as the types and names for the attributes and the actual methods for operating on those. For example, an object representing a person such as the medic is formed by giving particular values to attributes of persons defined in a class of persons. The individual objects differ in the values stored for one or more attributes. Classes in turn can share attributes and methods with different classes. For example, some attributes of persons are also attributes of equipment, such as being under the authority of a particular manager. Classes are typically related in a hierarchy, in which classes lower in the hierarchy inherit attribute types and methods from classes at higher levels in the hierarchy. In other embodiments, data is stored in structures that are different from data objects, such as in flat files of data or in relational databases.

In the illustrated embodiment, most objects are instances of a super class World. The World super class specifies a minimum number and type of attributes and methods that each world object includes. The World class includes an attribute that indicates a number of attributes, methods for setting and getting values of the attributes, and methods for identifying the parent or child of an object. The World class allows one or more attributes to be other world objects.

In the illustrated embodiment, the World class includes one attribute, called "Shape," that is an object of a Shape sub-class of a Collections class. A Collections class includes multiple attributes (n-tuples) and methods for setting and getting those attributes. The Shape sub-class includes an n-tuple of attributes used to describe a collection of one or more polyhedrons, which are prescribed three-dimensional shapes, and methods for comparing two or more n-tuples.

In the illustrated embodiment, the World class also includes one attribute, called "Way-Point," that is a world object of a Way-point sub-class. The Way-point sub-class includes an n-tuple of attributes used to specify a reference frame and coordinates of a location. In this embodiment, the World class also includes one or more transformation methods for converting the coordinates between different reference frames of world objects that are attributes of an object instantiated from the World class. In some embodiments, the Way-point sub-class n-tuple includes attributes that indicate orientation. A way-point object instantiated from the Way-point sub-class is a kind of world object that represents a "place" attribute in the world. As used herein, the term "way-point" is not limited to geographic way-points, such as Geodesic coordinates used by GPS systems, but also may specify a location of an object in arbitrary vector space. For example, in some embodiments the object represents a physical entity, such as a host computer or a certain router, and the way-point attributes represent a position in terms of number of hops ("hop count") from a reference network node. In another example embodiment, the way-point attributes represent a signal strength in deciBels (dB) relative to a reference signal strength for a radio frequency (RF) transmitter or receiver on a wireless network node. Because a way-point object is a world object, it has a Shape attribute, since all world objects own a shape from a container of predefined shape objects. Unlike more general objects of the World class, way-point objects do not own world objects (i.e., they do not include attributes that are world objects); hence a world object cannot be added as an attribute into a way-point object.

In the illustrated embodiment, there is a Brain class of objects. The Brain class includes an n-tuple of attributes used to describe a collection of one or more reactions, which themselves are objects of a Reaction class. A world object that owns an object of the Brain sub-class is called a "smart world object," or simply a "smart object." The Brain class includes methods to combine values from one or more reactions to produce a value for an attribute called behavior. The Reaction class includes methods to determine a reaction value based on the values of attributes of one or more other world objects, such as world objects that represent sensors.

As used herein, the "Infosphere" is the collection of world objects generated from the World super-class for describing a particular operational scenario. The Infosphere is distributed over multiple nodes of the distributed system 100 and describes the environment and operation of those multiple nodes and the users of the distributed system 100. In the illustrated embodiments, the particular operational scenario includes multiple network nodes of the distributed system itself deployed in a geographical area to support operations of one or more organizations. Thus the Infosphere includes world objects that describe all the network nodes of the distributed system, all the geographical locations of interest, and all the elements of the one or more organization. The different components are organized into multiple hierarchies that can each be represented by a tree data structure. Thus, the example operational scenario is organized into one hierarchy that describes the network node connectivity, another hierarchy of geographic entities, and another hierarchy for each organization involved, such as a government, a government agency, an army, a rescue force, an emergency response force, among others. In some embodiments, the organizational hierarchy describes social infrastructure, such as a power grid, a water and sewer system, a rail system, and a highway system, among others.

In the illustrated embodiment, the Infosphere is represented by a Root World object. The Root World object includes, as values of its attributes, pointers to root objects for the different hierarchies of the Infosphere, e.g., root objects for the network nodes, the geographic area and the one or more organizations interacting in the operational scenario A spatial hierarchy relates its objects based on a spatial relationship. For example, in the illustrated embodiment, the relationship is that one object in the hierarchy is inside a different object of the hierarchy. For example an object representing a building is inside of an object that represents the building's city. This relationship is called hereinafter the INSIDE-A relationship. This spatial relationship is different from a network topological relationship. In other embodiments, the spatial relationship represented by the hierarchy is different from the INSIDE-A relationship. For example, in other embodiments a spatial relationship indicates one object is in front of (or behind) another object; or indicates another object is bigger than (or smaller than) another object; or indicates one object has more polyhedron vertices than another object; or indicates one object is in transmission range of another object, or indicates other spatial relationships.

An organizational hierarchy relates its objects based on an organizational relationship. For example, in the illustrated embodiment, the relationship is that one object in the hierarchy is a component of a different object of the hierarchy. For example an object representing a particular trooper is a component of an object that represents the trooper's platoon. This relationship is called hereinafter the IS-A relationship. This organizational relationship is different from a network topological relationship or a spatial relationship. In other embodiments, the organizational relationship represented by the hierarchy is different from the IS-A relationship.

A network hierarchy relates its objects based on a network connection relationship. For example, in the illustrated embodiment, the relationship is that one object in the hierarchy is connected to a different object of the hierarchy. For example an object representing a particular network node on a subnetwork is connected to an object that represents the subnetwork. This relationship is called hereinafter the CONNECTED-TO relationship. In other embodiments, the network topology relationship represented by the hierarchy is different from the CONNECTED-TO relationship.

FIG. 2 is a block diagram that illustrates multiple hierarchies 200 that relate objects in the Infosphere, according to an embodiment. In each hierarchy below a root level, an object has a relationship with one parent object at a level above from which the object may inherit values of one or more attributes. One object may have at a level below any number of children objects that have the same relationship to the object. At least three hierarchies are represented: a network topology hierarchy descending from a network topology root object 210; a spatial hierarchy descending from a spatial root object 220; and an organizational hierarchy descending from an organizational root object 230. In other embodiments, other hierarchies are included as indicated by the ellipsis 201. For example, if organization root object 230 represents the commander of an army, other organizational root objects are used to represent the commander of a rescue force, or the commander of a police force, or the head of a political organization, or an infrastructure system, such as a power grid, a water and sewage system, and a road system, among others.

The multiple hierarchies are joined by having the same parent object, the Root World object 202.

Each object in the hierarchy has a particular type of relationship with a parent object. For example, subnetwork objects 212a, 212b and others indicated by ellipsis 211a have CONNECTED-TO relationships with a network topology root object 210, as represented by the solid line arrows 216a, 216b. Similarly, theater objects 222a, 222b and others indicated by ellipsis 221a have INSIDE-A relationships with a spatial root object 220, as represented by the dotted line arrows 226a, 226b. Similarly, division objects 232a, 232b and others indicated by ellipsis 231a have IS-A relationships with organizational root object 230, as represented by the dashed-dotted line arrows 236a, 236b. The hierarchies continue through one or more levels, as represented by ellipses 211b, 221b, 231b. The hierarchies end at atomic objects that are not further subdivided and that may appear at any level in the hierarchy. For example, the network topology hierarchy ends at objects 214a, 214b and others indicated by ellipsis 211c that represent individual network nodes. Similarly, the spatial hierarchy ends at objects 224a, 224b and others indicated by ellipsis 221c that represent the finest grained spatial units, such as a cubic mile or a cubic meter of earth or air at a given location, or a room in a building. Similarly, the organizational hierarchy ends at objects 234a, 234b and others indicated by ellipsis 231c that represent the finest grained organizational units, such as a rescue worker in a rescue organization, or a power circuit in a power system.

Each hierarchy of the different hierarchies corresponding to the different relationships is represented in the distributed database system 100 by a tree data structure. A tree data structure provides a more efficient way to represent hierarchical relationships among objects than does a graph data structure. One tree data structure represents the relationships between the World root object 202 and the three or more root objects 210, 220, 230 and others indicated by ellipsis 201. Three or more separate tree data structures represent the trees descending from the root objects 210, 220, 230 or other root structures indicated by the ellipsis 201. In some embodiments, each hierarchy representing one type of relationship maintained in a tree structure is called a "flavor" of hierarchy, or simply, a flavor and the associated relationship is called a relationship flavor.

Typically, the tree data structures include only data that points to where the objects can be retrieved, such as a memory location or a universal resource location (URL) address, not the objects themselves. In some embodiments, one or more objects are included in the tree data structures.

In the illustrated embodiment, objects in one hierarchy are allowed to form relationships with objects in another hierarchy. Such objects (or data pointing to such objects) then appear in trees for more than one hierarchy.

For example, object 214a representing a wireless access point (not shown) in room 190 is allowed to form an INSIDE-A relationship 226*c* with a spatial object, such as object 224*b* representing the room. Similarly, object 234*a* representing an individual rescue worker is allowed to form an INSIDE-A relationship 226*d* with a spatial object, such as object 224*b* representing room 190. Object 214*b* representing a mobile node (e.g., network node 110*b*) worn by a rescue worker is allowed to form an IS-A relationship 236*c* with an organizational object, such as object 234*a* representing the rescue worker in room 190.

Many of these relationships are dynamic. For example, as network node represented by object 214*b* moves, it breaks a CONNECTED-TO relationship with one node (e.g., represented by object 212*a*) and establishes a CONNECTED-TO relationship with another node (e.g., represented by object 214*a*). The relationships that cross hierarchies are expected to be especially dynamic. For example, as the rescue worker associated with object 234*a* moves through a city, the INSIDE-A relationship 226*d* is expected to change from one object of the spatial hierarchy to another, e.g. from object 224*b* representing room 190 to object 224*a* representing a different room in the same or different building.

It is noted that world objects of a spatial flavor (e.g., room 190) typically have a fixed shape and have a variable number of children determined by which objects are positioned within their shape. In contrast, world objects of an organizational flavor (e.g., a platoon object) typically have a fixed or slowly changing number of children (e.g., all rescue workers in the platoon), but have a variable shape as those children move around. The organizational object's shape varies to a polyhedron of the correct dimensions to encompass all of its children's shapes and locations.

Figure 3:
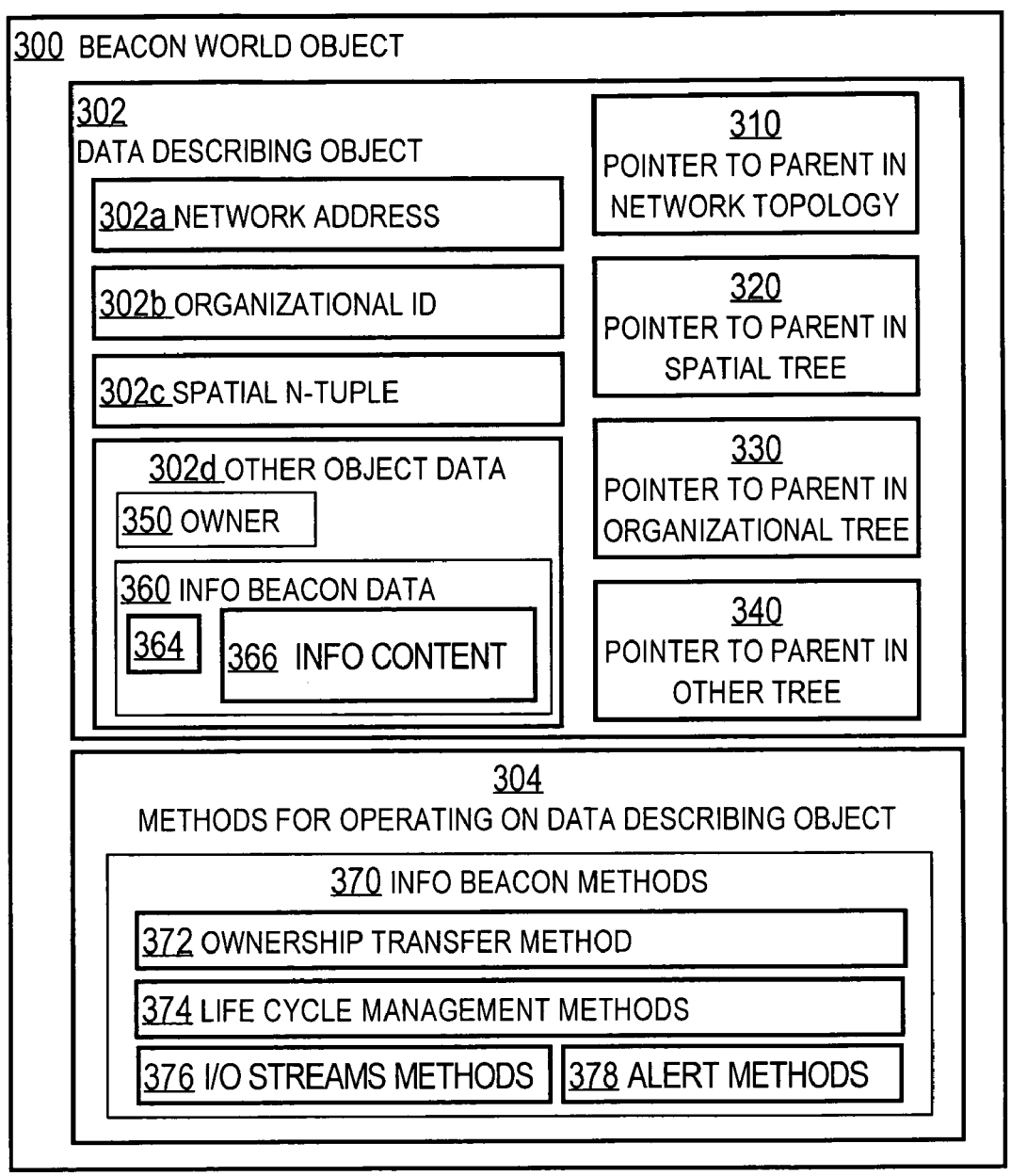
FIG. 3 is a block diagram that illustrates contents of an beacon data object, according to an embodiment.

FIG. 3 is a block diagram that illustrates contents of a world object for the example of a beacon world object 300, according to an embodiment. Each world object includes attributes and methods as stated above. For example world object 300 includes data describing attributes 302 and data indicating methods 304. Typically the method data 304 stored in object 300 is a call to a routine for which the instructions are stored elsewhere, such as in a data structure describing a class or super-class for the object. In the embodiment illustrated in FIG. 3, the attributes hold data 302 describing the object, such as a network address 302*a*, an organizational identifier (ID) 302*b*, a spatial n-tuple 302*c*, and other object data 302*d*. Objects that do not describe network nodes do not include a network address 302*a*. Objects that are not part of an organization do not include an organization ID 302*b*. Objects that do not have spatial properties do not include the spatial n-tuple 302*c*.

The spatial n-tuple is any vector of one or more values that describe spatial properties of the object. For example, in one embodiment, the spatial n-tuple includes values for the following 11 attributes: one value that indicates a reference frame, 3 coordinates that indicate a position relative to an origin of the reference frame, three size factors, a pointer to a shape, and three coordinates indicating an orientation. In the illustrated embodiment, the reference frame and coordinates are contained in a way-point object and the spatial n-tuple 302*c* includes a pointer to the way-point object. Similarly, the shape is expressed in a shape object and the spatial n-tuple 302*c* includes a pointer to the shape object. The shape gives context for the size and orientation values in the spatial n-tuple 302*c*.

The other object data 302*d* includes values of attributes that describe a particular entity associated with the world object. For example, in object 224*b* that represents room 190, the other object data 302*d* includes data that indicates the type of light and power in the room, the number and position of windows in the room, the maximum classification level, the capacity of the room for persons, the color of the room walls, the resident for the room and the material currently stored in the room, among others. The attributes that describe a room are typically listed in a Room Class that is a particular sub-class of the World class. Some of this information is included as pointers to other objects. For example, the resident for the room is indicated by a pointer to another object that describes the resident. As stated above, a world object may include one or more other world objects; in such objects the other data 302*d* includes the pointers to the other world objects. For example, in a world object representing a building, the other data 302*d* includes pointers to world objects owned by that building, such as world objects representing different floors or different rooms in the building. The non-spatial information in a world object, e.g., the other object data 302*d*, is sometimes called the "infomatics" of the Infosphere.

In some embodiments, data 302 includes pointers to parents in one or more hierarchies. Since each object has only one parent in a particular hierarchy (except the World Root object which has no parent), this is easily accomplished. In the illustrated embodiment, object 300 includes a pointer 310 to a parent in the network topology hierarchy; includes a pointer 320 to a parent in the spatial hierarchy; includes a pointer 330 to a parent in the first organizational hierarchy; and includes a pointer 340 to a parent in another hierarchy. These pointers constitute a portion of the tree data structures. In some embodiments, the pointers 310, 320, 330, 340 are values of attributes in an object of a Parents sub-class of the Collections class. In some embodiments, the pointers 310, 320, 330, 340 are omitted, and parent child relationships are maintained in separate tree structures, such as portions of tree structure for topological data and spatial data in distributed database 120. In some embodiments, data 302 includes pointers to children of the object in one or more hierarchies. An object may have any number of children of a particular hierarchy flavor, and therefore may have multiple pointers to children objects in the same flavor hierarchy. In some embodiments, the pointers to children are values of attributes in an object of a Children sub-class of the Collections class.

Only one parent of a world object owns the world object and is allowed to change contents of the work object. For example, although network node object 214*b* has a subnetwork object 212 parent and a organization unit object 234*a* parent, only one parent owns the network node 214*b* and can change values of the attributes of the object Because a mobile network node is expected to retain its relationship with an organization unit and vary its relationships with subnetworks of nodes, it is natural to make the organization unit 234*a* the owner of network node 214*b* in some embodiments. In other embodiments a different object owns the mobile node object 214*b*. The owner need not even be a parent. In the illustrated embodiment, the other object data 302*d*, includes an owner attribute 350 that holds data that indicates which of the parents is the owner of the world object.

In some embodiments of world objects, various objects are replicated for more convenient use by one or more nodes. The replicated objects are owned by the original object An owner on one node periodically refreshes the other copies on various other nodes. If a copy is not refreshed within a particular time, the copy is deemed stale and unreliable. After some additional time without a refresh message from the master, it is assumed that the master has been deleted, and the copy is then deleted.

According to embodiments of the invention, a beacon world object 300 is established. In a beacon world object 300, other object data 302*d* includes info beacon data 360. The info beacon data includes policy data 364 and info content data

366. The policy data 354 holds data that indicates choices made for beacon methods, described in more detail below, such as policy choices for methods to manage life cycle, ownership transfer, alert, and input/output of content data. It is anticipated that life cycles may vary from a few milliseconds to a persistent existence without definite end in various embodiments. Info content data 366 holds data that indicates the information generated dynamically about a physical entity. For example, the search and rescue state of a room (all clear, victim in need of medical attention, victim-deceased, etc.) is indicated by the info content data 366. In other examples and other embodiments, other data is included, such as environmental measurements made in a room, a digital image or audio recording made inside a room, a code for a lock in a room or a password for a computer in the room.

The methods data 304 includes instructions for methods to perform spatial operations on two or more objects owned by the world object as indicated in data 302. In some embodiments, methods 304 include methods to accept a spatial n-tuple of a second object and determine a spatial relationship between the two objects. For example, a method determines from the hierarchy that one object is inside the other or not. A method determines the distance between the origins of the two entities described by the objects. A method determines the distance between the outer surfaces of the two entities (a negative distance indicates the two entities overlap, a sufficiently large negative value compared to the size indicates one is inside the other). A method determines the orientation of the second entity relative to the first (e.g., to answer the question of whether one in front of the other). A method determines the global coordinates of either object. A method computes a movement for one object to increase or decrease distance to the other object. Many other methods to spatially transform or answer spatial queries are included in various embodiments. In an example world object each method includes JAVA instructions, an object-oriented programming language that is readily portable from one node to another node in a network.

According to embodiments of the invention, the methods data 304 includes instructions for info beacon methods 370 in the beacon world object 300. In the illustrated embodiment, the info beacon methods 370 include one or more ownership transfer methods 372, life cycle management methods 374, input/output (I/O) streams methods 376 and alert methods 378. The ownership transfer methods provide a means to change the world object that owns the beacon object, so that the beacon can be left in the care of a different object than the object that generated the beacon object. It is anticipated that the ownership will be transferred to data objects that represent stationary physical entities, such as spatial objects, or data objects that represent moving physical entities such mobile platforms and search targets. The life cycle management methods allow an object that owns the beacon object to delete the beacon object when life cycle termination conditions occur. Multiple different termination conditions are allowed and are specified for a particular beacon object in the policy data 364. The I/O streams methods provide means for an owner to change the info content data 366 based on further input from a node, such as from human interface or a sensor measurement. The I/O streams methods provide means for dispensing the information content data 366 in a format specified in a request from another object. The information content data 366 can be dispensed from the original instance of the beacon object or any current copy of the beacon object. The alert methods provide means for the an instance of the beacon object, including any copies of the beacon object to identify another world object that satisfies conditions for receiving notice of the existence of the beacon object.

In an example embodiment, each world object, including beacon world object 300, is an extensible markup language (XML) document. XML is well known in the art of network communications. XML documents employ user-defined tags to divide a stream of data into separate portions which can be nested. One set of tags is used to portion information that describes spatial and organizational information.

According to embodiments described in the next section, non-routing data dynamically generated for a physical entity by a mobile node represented by a first object in database 120 is stored as info content data 366 in a beacon object 300, and ownership of the beacon object is transferred to a different second object, such as an object that represents or is associated with the physical entity in the distributed database. For example, the mobile node 110*b* generates a beacon object describing room 190 and transforms ownership of that beacon object from the world object 234*b* that represents the mobile node 110*b* to the world object 224*b* that represents the room 190. In some embodiments, the beacon object is allowed to have ownership of itself, e.g., to specify itself in owner data 350. In such embodiments, any node that has the master beacon object (not a copy) is able to act as owner of the beacon object and change the info content data 360.

In some embodiments, the generation of beacon objects by a node is facilitated by including in the distributed database 120 templates for beacon objects with policy data 364 or info beacon methods 370, or both, specifically designed for operations expected from a particular node. For example, templates for beacon objects for a mobile node carried by a rescue worker includes an I/O streams method with a predefined menu of expected states for a room, building, or cave being searched, as well as a free-form state for receiving information typed at a keyboard. In contrast, templates for beacon objects for a fixed access point node in a room in a building includes an I/O streams method for storing environmental data (e.g., temperature, humidity, oxygen level, carbon monoxide level) and video data from a camera in the room and converting that environmental and video data among various standard formats.

Figure 4:
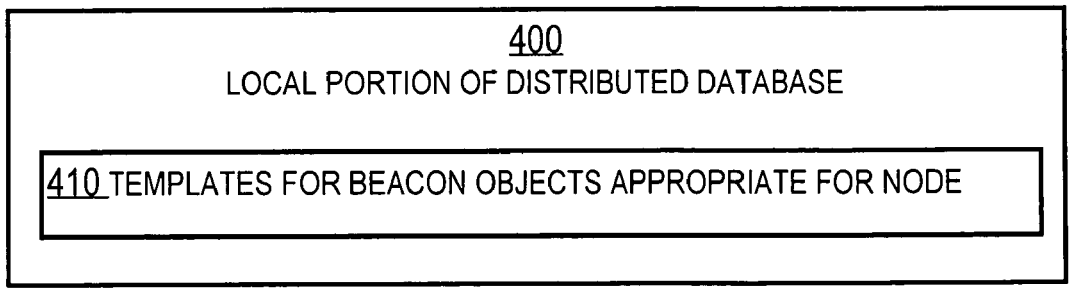
FIG. 4 is a block diagram that illustrates contents of a local portion of distributed database on a mobile router, according to an embodiment.

FIG. 4 is a block diagram that illustrates contents of a local portion 400 of distributed database 120 on a network node, according to an embodiment. Local portion 400 is a particular embodiment of portion 122*a* or 122*b* shown in FIG. 1A and FIG. 1B. The local portion 400 includes templates 410 for beacon objects appropriate for the node. A new beacon object is created by generating an instance of one of the beacon objects in the templates 410. Data that currently describes a physical entity in the vicinity of the node is then received, using a I/O streams method of the template, such as in response to a prompt or an activation of a sensor 118, to fill info content data 366. In some embodiments, additional data is received from the node, such as in response to a prompt or an activation of a sensor 118, to fill or change the policy data 364 in the template. Such use of templates greatly facilitates the creation of beacon objects.

3. Method for Distributing Dynamically Generated Data

Figure 5:
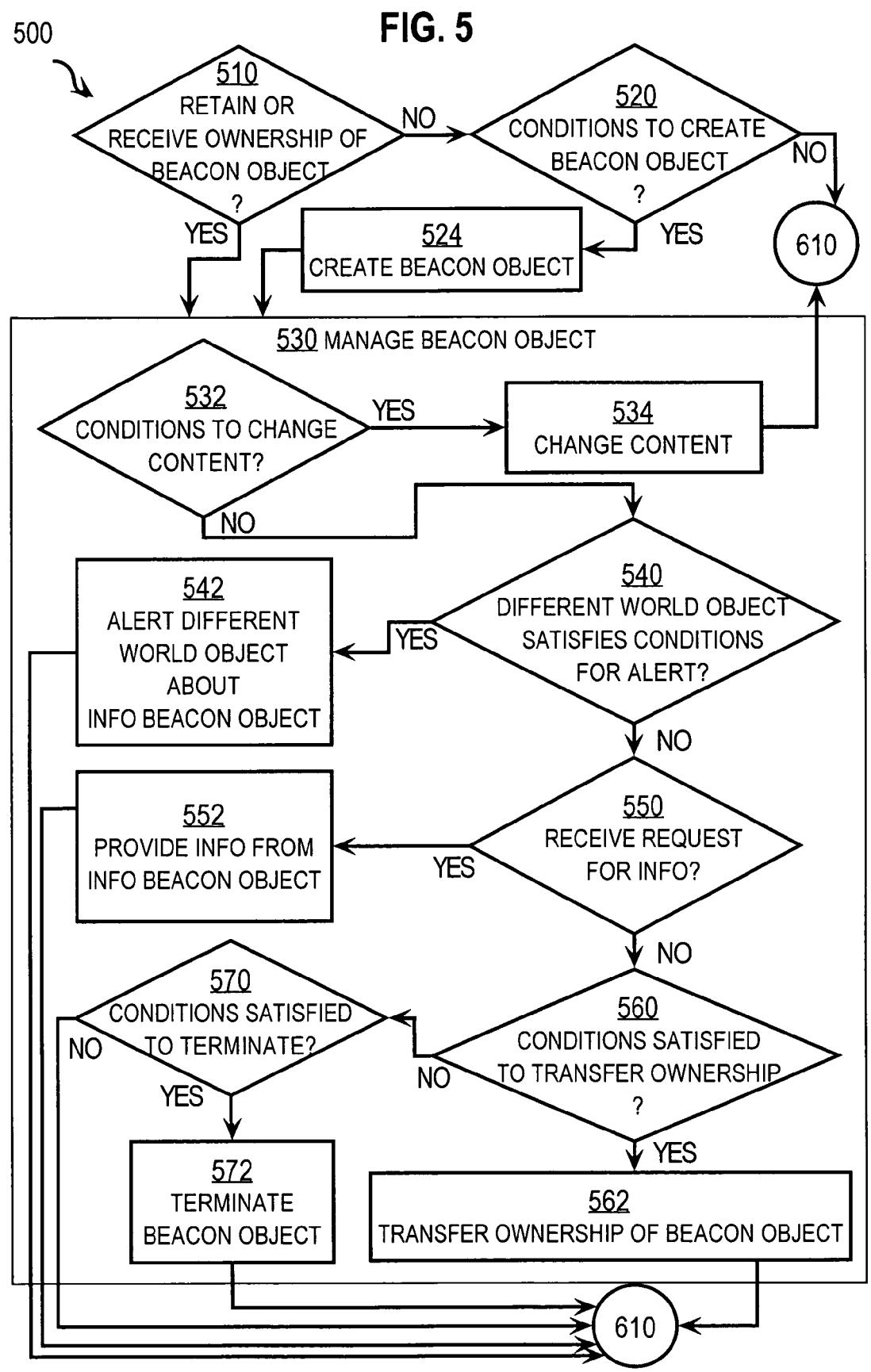
FIG. 5 is a flow diagram that illustrates at a high level a method for distributing data based on a beacon data object on a node that obtains ownership of the beacon object, according to an embodiment.
Figure 6:
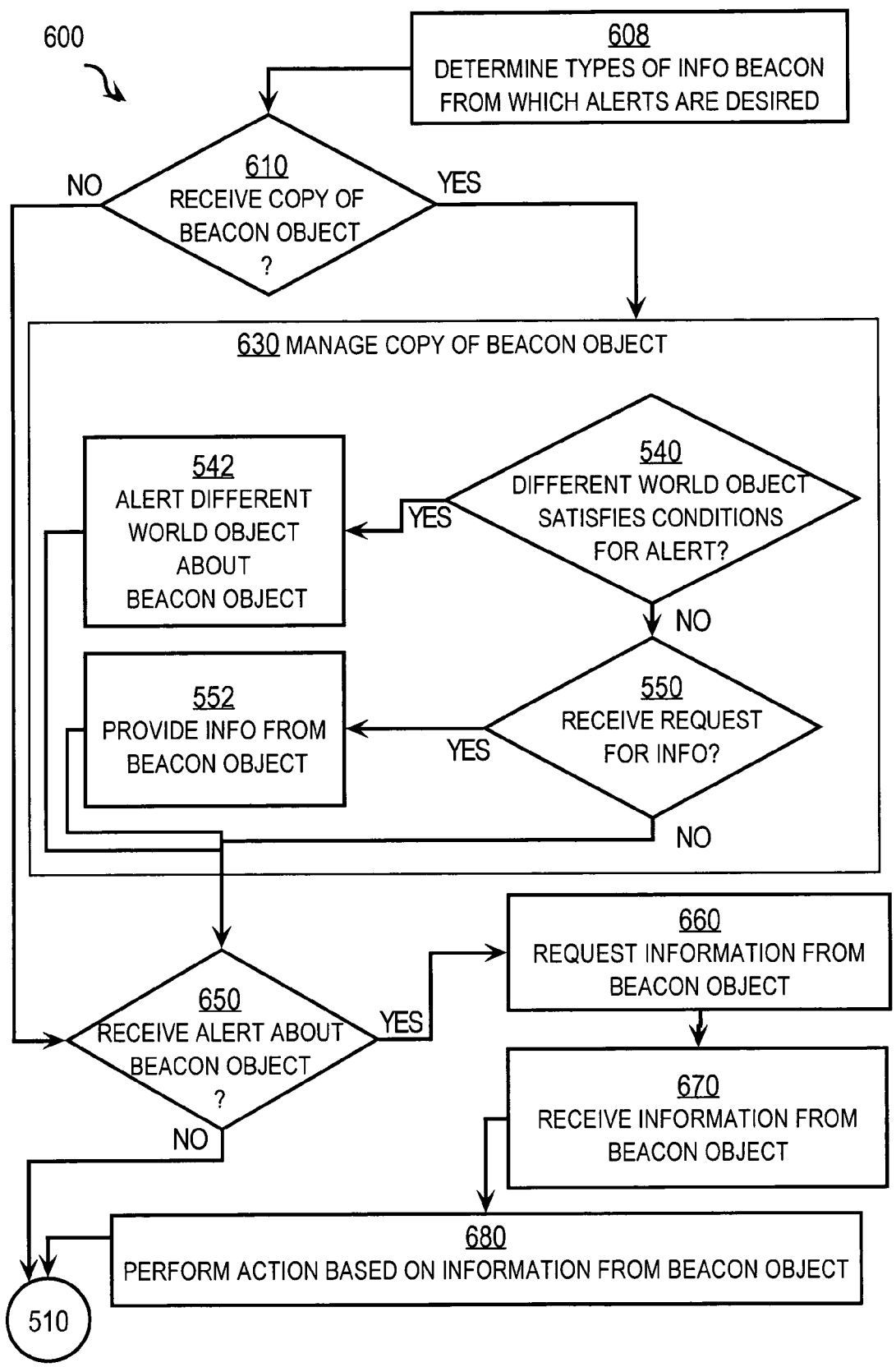
FIG. 6 is a flow diagram that illustrates at a high level a method for distributing data based on a beacon data object on a node that need not obtain ownership the beacon object, according to an embodiment.

Methods for generating and using beacon objects are described in this section with reference to FIG. 5 and FIG. 6. Although steps are shown in FIG. 5 and FIG. 6 in a particular order for purposes of illustration, in other embodiments one or more steps are performed in a different order, or overlap in time, or are performed by one or more different processing threads operating in series or in parallel, or are omitted, or are changed in some combination of these ways.

3.1 Method at a Node that Obtains Ownership

FIG. 5 is a flow diagram that illustrates at a high level a method 500 for distributing data based on a beacon data object on a node that obtains ownership of the beacon object, according to an embodiment.

In step 510, it is determined whether the current node has retained or received ownership of an extant beacon object. A node receives ownership of a beacon object by virtue of a transfer from a current owner of the beacon object, as described in more detail below with reference to step 560 and 562. A node owns a data object if it hosts a beacon object that owns itself or hosts an object that owns the beacon object. If so, control passes to step 530 to manage the beacon object as an owner. If not, control passes to step 520.

In step 520, it is determined whether conditions are satisfied for creating a new beacon object. These conditions are the conditions for dynamic generation of data for the distributed database. For example, a fireman has pressed a key on a mobile node to indicate a room has been searched and a victim found in need of medical attention. As another example, a security officer has identified a one-time password to be used by a maintenance worker to gain access to a secure room in his building and has entered data to indicate the maintenance worker and the password.

If it is determined, in step 520, that conditions are not satisfied for creating a new beacon object, then control passes to step 610 in method 600 described in more detail below with reference to FIG. 6. In general, the steps of method 600 are performed by any node in the network, regardless of ownership of a beacon object. After performing the steps of method 600, control passes back to step 510.

If it is determined, in step 520, that conditions are satisfied for creating a new beacon object, then control passes to step 524. In step 524, a beacon object is created. For example, an instance of a rescue worker beacon object is instantiated from a class of rescue worker beacon objects stored in templates 410 in the local portion of the distributed database. During step 524, the info content data 366 is filled and policy data 364 is set for use with one or more of the beacon methods 370 for alerts, transfer, and termination. For the example of the victim needing medical attention, the ownership transfer policy data is set to let the beacon object own itself. (Thus the beacon object becomes the responsibility of any node that hosts the beacon object). In this example, the life cycle policy is to keep the beacon alive until the victim is removed from the room by a medical worker above a certain level of authority. The alert policy is to alert only objects that represent medical workers within a certain distance range.

For the example of the one-time password, a security beacon object is instantiated from a class of security beacon objects stored in templates 410 in the local portion of the distributed database. During step 524, the info content data 366 is filled with the one-time password. The ownership transfer policy data is set to transfer ownership of the beacon object to another object that represents the room in the building where access is granted; the life cycle policy is to keep the beacon alive until the password is used or until an end of the worker's shift, whichever comes first; and the alert policy is to alert any member of the maintenance team.

In step 530, the beacon object is managed by the current node. In the illustrated embodiment, step 530 includes steps 532, 534, 540, 542, 550, 552, 560, 562, 570, 572. After step 530, control passes to step 610 of method 600.

In step 532, it is determined whether conditions are satisfied to change the information content of the beacon object. Only the owner may change the contents, but step 530 is only performed by the owner. In some embodiments, this step is performed in response to input from a human operator. For example, the rescue worker witnesses the victim get up and leave the room and presses a key that indicates room cleared; or the security office learns that no cleaning crew is scheduled for this evening and erases the password. In some embodiments, this step is performed automatically, for example a carbon monoxide sensor connected to a node that has ownership of an hazardous environment beacon object provides a new carbon monoxide level reading above a threshold for recording a change in the environmental beacon object.

If it is determined in step 532 that conditions are satisfied to change the information content of the beacon object, then control passes to step 534. In step 534 the info content data 366 are changed. For example, the rescue worker's beacon object for room 190 has data in the info content data 366 changed to indicate all clear. Control then passes to step 610. In some embodiments, control passes to step 540, described next.

If it is determined in step 532 that conditions are not satisfied to change the information content of the beacon object, then control passes to step 540.

In step 540, it is determined whether conditions are satisfied to send an alert to a different world object. Any method may be used to determine whether conditions are satisfied to send an alert. In an illustrated embodiment, one or more alert methods 378 in the beacon object are executed by the node. For example, in an illustrated embodiment, an alert method 378 is executed by the node to determine whether any mobile node object having a location within a particular range of the current node has indicated an interest in alerts from a rescue worker search beacon. In some embodiments the type of beacon object and type of remote object are also considered in determining whether to send an alert. For purposes of illustration, it is assumed that a mobile node object of the right type (e.g., network node object 214a that represents mobile node 110a of a rescue worker) has indicated an interest in alerts from a rescue worker search beacon object, and that a spatial n-tuple of the mobile node object (e.g., network node object 214a) indicates that the mobile node 110a is within range. Therefore conditions are satisfied for sending an alert to the mobile node object 214a.

If it is determined in step 540 that conditions are satisfied to send an alert to a different world object, then control passes to step 542. In step 542 an alert is sent to the different world object that a beacon object of a certain desired type is in range. In some embodiments, the alert includes another object, such as a string object with text that describes the beacon or its content. It is up to the receiver of the alert type to understand or use the included object, or both, if such an object is included. In the example, an alert is sent to the world object representing mobile node 110a that a rescue worker beacon is in range. The alert is sent in any manner known in the art. In some embodiments, the alert is sent to a node that is a router in a routing control packet using an RSS format. As described in more detail in the next sub-section for method 600, after receiving the alert, the world object may request the information content of the beacon object in one or more specified formats. In some embodiments (especially embodiments in which all nodes are known to accept data in the stored formats) the alert includes the information content data 366. In such embodiments, a separate request for the information content data 366 of the information beacon is not needed and can be omitted. After step 542, control then passes to step 610. In some embodiments, control passes to step 550, described next.

If it is determined in step 540 that conditions are not satisfied to send an alert to a different world object, then control passes to step 550.

In step 550, it is determined whether a request has been received from a different world object for the information content data 366 of the beacon object. The request is received in any manner known in the art. In some embodiments, the request is received in a routing control packet using an RSS format. For purposes of illustration, it is assumed that a mobile node object (e.g., network node object 214a that represents mobile node 110a) has requested the info content data 366 of the beacon object. It is further assumed that the request includes data that indicates image data should be sent in Joint Photographic Experts Group (JPEG) format.

If it is determined in step 550 that a request has been received from a different world object for the information content data 366 of the beacon object, then control passes to step 552. In step 552 data based on some or all of the information content data 366 is sent to the requesting world object on its node. In an illustrated embodiment, the data is sent according to one or more I/O streams methods 376 in the beacon object. The content is sent in any manner known in the art. In some embodiments, the content is sent in a routing control packet using an RSS format. In the example, a code is sent that represents one of the standard states for a room during a rescue mission. If the information content data 366 includes an image (perhaps an image of the victim in the room) the image is sent in JPEG format, as specified in the request. If the image is stored in another format (for example, in the tagged image file format, TIFF), then a method for converting the stored data (e.g., the TIFF image) to a JPEG image in the I/O streams methods 376 is executed to convert the data. The converted data is sent to the requesting node in step 552. Control then passes to step 610. In some embodiments, control passes to step 560, described next, instead.

Steps 540, 542, 550 and 552 may also be performed by a node that has only a copy of the beacon object and does not have ownership of the master beacon object, as described in the next sub-section with reference to FIG. 6.

If it is determined in step 550 that a request has not been received from a different world object for the information content data 366 of the beacon object, then control passes to step 560.

In step 560, it is determined whether conditions are satisfied to transfer ownership. Any method may be used. Only the owner may transfer ownership, but step 530 is only performed by the owner. In the illustrated embodiment, the conditions to transfer ownership are included in policy data 354 for the beacon and the check on those conditions is made by executing one or more of the ownership transfer methods 372. For example, the mobile node 110b determines that conditions are satisfied for transferring ownership to the beacon object itself as soon as the beacon object is created in step 524. Similarly a security administrator represented by an organizational unit determines that conditions are satisfied for transferring ownership to the spatial unit representing the room to be accessed as soon as the beacon object is created in step 524.

If it is determined in step 560 that conditions are satisfied to transfer ownership, then control passes to step 562. In step 562, ownership is transferred to a different object executing on the same or different node. In an illustrated embodiment, the owner data 350 in the beacon object is changed to the new world object and the beacon object is sent to a node that hosts the instance of the world object that is to receive ownership. The beacon object is sent in any manner known in the art. In some embodiments, the beacon object is sent in a routing control packet using an RSS format. In the example, the beacon object indicating itself as owner is sent to a node in subnetwork 102 where the spatial unit 224b that represents the physical room is hosted. One or more copies are then distributed by the owner. For example, a copy of the beacon object is sent to a wireless access point (not shown) for subnetworks 102 in room 190. FIG. 1A and FIG. 1B show that beacon object 128 is stored in the distributed database in association with the master room object 129. Control then passes to step 610. In some embodiments of step 562, a human supervisor, or a supervision process, generates beacon objects and associates them with a world object (e.g., such as a way point world object to associate the beacon with a location) and assigns ownership of the beacon object to one or more objects to manage the beacon, such as objects that represent one or more workers.

If it is determined in step 560 that conditions are not satisfied to transfer ownership, then control passes to step 570.

In step 570, it is determined whether conditions are satisfied to terminate the beacon object. Any method may be used. Only the owner may terminate the beacon object, but step 530 is only performed by the owner. In the illustrated embodiment, the conditions to terminate the beacon object are included in policy data 364 for the beacon and the check on those conditions is made by executing one or more of the life cycle management methods 374. For example, the process on mobile node 110a determines that conditions are satisfied for terminating the beacon object as soon as the victim is cleared from the room 190 based on actions performed by the user of mobile node 110a after receiving an alert and the associated information content data 366 of the rescue worker beacon. Similarly the process on the node that holds the master instance of the spatial unit object that represents room determines that conditions are satisfied for terminating the beacon object at the end of the shift of the maintenance crew.

If it is determined in step 570 that conditions are satisfied to terminate the beacon object, then control passes to step 572. In step 572 the beacon object is deleted and pointers to it from all its parents, including its owner, are deleted. Copies of the beacon terminate themselves according to the life-cycle code and policy data they hold. If this process to eliminate copies fails, then copies of the beacon object become stale and are automatically deleted after a certain time without being refreshed. After step 572, control passes to step 610. In some embodiments, control passes back to step 510, described above.

3.2 Method at a Node that Need Not Have Ownership

FIG. 6 is a flow diagram that illustrates at a high level a method for distributing data based on a beacon data object on a node that need not own the beacon object, according to an embodiment.

In step 608, it is determined what types of beacon objects issue alerts of interest for the node. The node will ignore alerts from beacon types not determined during step 608. Any method may be used to determine the types of beacons from which alerts are of interest. In some embodiments, all alerts are of interest. In some embodiments only alerts that are not of interest are listed and all other alerts are determined to be of interest. In some embodiments, alerts of the same type as any world object having a master instance on the node are automatically determined to be of interest.

In step 610, it is determined whether a copy of a beacon object has been received. If so, then control passes to step 630 to manage a copy of the beacon object. Step 630 includes steps 540, 542, 550 and 552, described above for step 530. Step 630 also includes steps (not shown) that are standard for managing a copy, such as receiving periodic refreshes and marking the copy as stale if it is too long since the last refresh, and deleting the copy if the time since the last refresh exceeds a certain value. Control then passes to step 650.

If it is determined, in step 608, that a copy of a beacon object has not been received, then control also passes to step 650.

In step 650 it is determined whether an alert of interest has been received. Any method may be used to make this determination. If an alert has not been received, then control passes back to step 510 in method 500 to determine whether an owned beacon object is to be managed. However, if it is determined in step 650 that an alert of interest has been received, then control passes to step 660. For example, when mobile node 110*a* represented by network node object 214*b* receives an alert for the organizational unit object representing the medic, control passes to step 660.

In step 660, in response to receiving the alert, a request is sent to the beacon object for the information content data 366. As described above, in the illustrated embodiment, this request includes data that indicates JPEG format for image data, if any; and this request is passed in a routing protocol control packet using the RSS format.

In response to sending the request, the node in step 670 receives the data derived from the info content data 366, such as the code for the room status and a JPEG image converted from the TIFF image stored in the information content data 366. As described above, in the illustrated embodiment, this information is passed in a routing protocol control packet using the RSS format. Control then passes to step 680.

In step 680, an action is performed based on the information from the beacon object. For example, based on the information from the beacon object that a victim in need of medical attentions was found in room 190, the medic who carries mobile node 110*a* is directed to go to room 190, such as by data presented in a heads-up display on a visor of the medic's helmet that serves as mobile platform actuator 116 for the mobile node 110*a*. Similarly, based on the credentials from the beacon object for access to a secure room, the door to the secure room opens when a member of the maintenance crew represented by an object in the distributed database is identified by a sensor at the node associated with the room, such as a card reader. Control then passes back to step 510 in method 500 to determine whether an owned beacon object is to be managed.

Based on the methods 500 and 600, a dynamically generated information beacon is deployed from a list of one or more pre-defined beacon type templates. The deployed beacon changes ownership to stay associated with a fixed or moving object in a distributed database. The deployed beacon alerts other nodes when they are in a sphere of influence of the beacon, and passes the beacon's information to the alerted node automatically or upon request. The beacon completes its life cycle according to any or a variety of life-cycle policies including indefinite persistence, and is deleted automatically when no longer useful, should that condition arise.

4.0 Implementation Mechanisms—Hardware Overview

Figure 7:
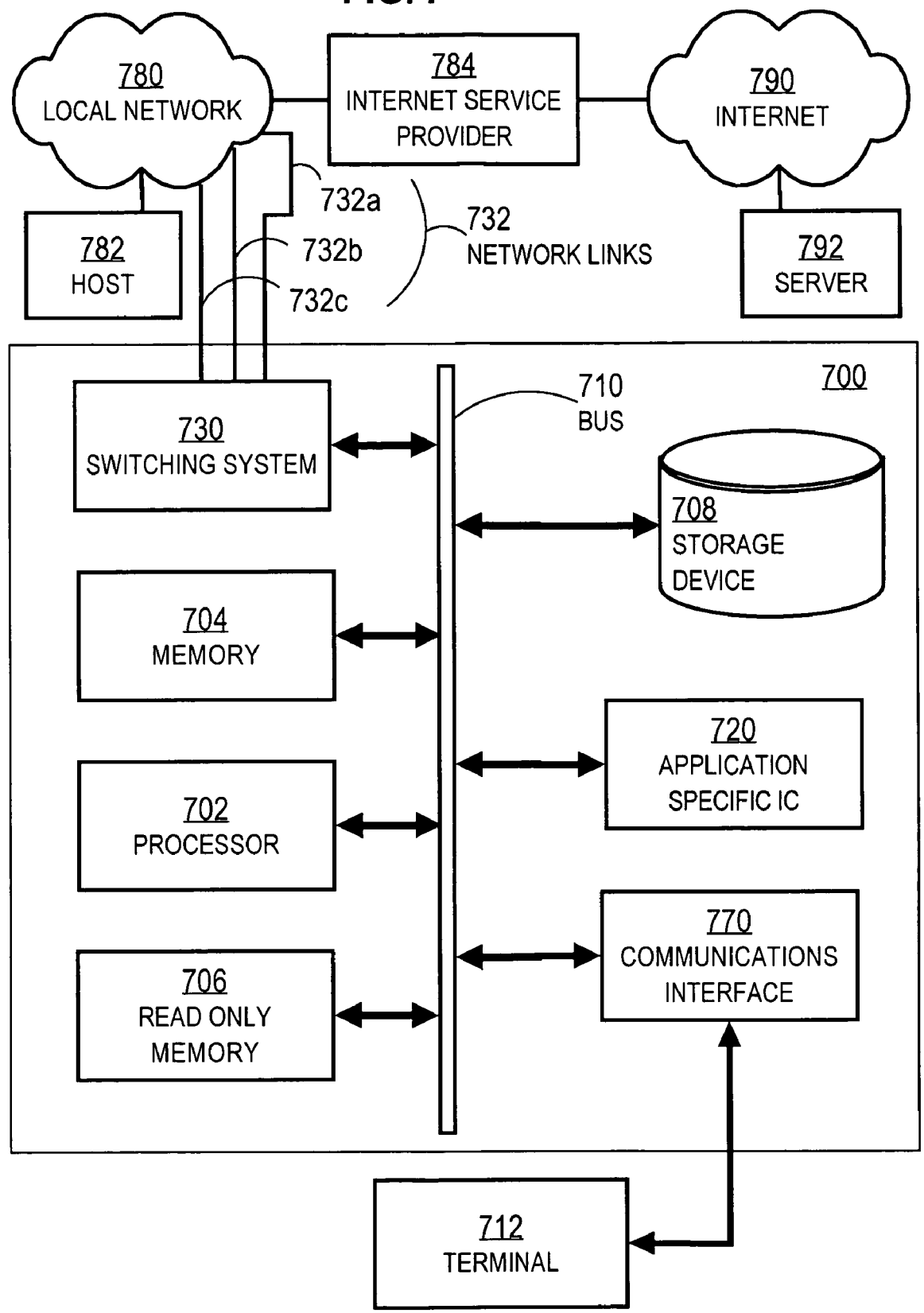
FIG. 7 is a block diagram that illustrates a computer system upon which an embodiment of the invention may be implemented.

FIG. 7 is a block diagram that illustrates a computer system 700 upon which an embodiment of the invention may be implemented. The preferred embodiment is implemented using one or more computer programs running on a network element such as a router device. Thus, in this embodiment, the computer system 700 is a router.

Computer system 700 includes a communication mechanism such as a bus 710 for passing information between other internal and external components of the computer system 700. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitute computer instructions.

Computer system 700 also includes a memory 704 coupled to bus 710. The memory 704, such as a random access memory (RAM) or other dynamic storage device, stores information including computer instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a non-volatile (persistent) storage device 708, such as a magnetic disk or optical disk, for storing information, including instructions, that persists even when the computer system 700 is turned off or otherwise loses power.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 710 for use by the processor from an external terminal 712, such as a terminal with a keyboard containing alphanumeric keys operated by a human user, or a sensor. A sensor detects conditions in its vicinity and transforms those detections into signals compatible with the signals used to represent information in computer system 700. Other external components of terminal 712 coupled to bus 710, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 712. In some embodiments, terminal 712 is omitted.

Computer system 700 also includes one or more instances of a communications interface 770 coupled to bus 710. Communication interface 770 provides a two-way communication coupling to a variety of external devices that operate with their own processors, such as printers, scanners, external disks, and terminal 712. Firmware or software running in the computer system 700 provides a terminal interface or character-based command interface so that external commands can be given to the computer system. For example, communication interface 770 may be a parallel port or a serial port such as an RS-232 or RS-422 interface, or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 700 includes switching system 730 as special purpose hardware for switching information for flow over a network. Switching system 730 typically includes multiple communications interfaces, such as communications interface 770, for coupling to multiple other devices. In general, each coupling is with a network link 732 that is connected to another device in or attached to a network, such as local network 780 in the illustrated embodiment, to which a variety of external devices with their own processors are connected. In some embodiments an input interface or an output interface or both are linked to each of one or more external network elements. Although three network links 732*a*, 732*b*, 732*c* are included in network links 732 in the illustrated embodiment, in other embodiments, more or fewer links are connected to switching system 730. Network links 732 typically provides information communication through one or more networks to other devices that use or process the information. For example, network link 732*b* may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides routing information for use with switching system 730.

The switching system 730 includes logic and circuitry configured to perform switching functions associated with passing information among elements of network 780, including passing information received along one network link, e.g. 732*a*, as output on the same or different network link, e.g., 732*c*. The switching system 730 switches information traffic arriving on an input interface to an output interface according to pre-determined protocols and conventions that are well known. In some embodiments, switching system 730 includes its own processor and memory to perform some of the switching functions in software. In some embodiments, switching system 730 relies on processor 702, memory 704, ROM 706, storage 708, or some combination, to perform one or more switching functions in software. For example, switching system 730, in cooperation with processor 704 implementing a particular protocol, can determine a destination of a packet of data arriving on input interface on link 732*a* and send it to the correct destination using output interface on link 732*c*. The destinations may include host 782, server 792, other terminal devices connected to local network 780 or Internet 790, or other routing and switching devices in local network 780 or Internet 790.

The invention is related to the use of computer system 700 for implementing the techniques described herein. According to one embodiment of the invention, those techniques are performed by computer system 700 in response to processor 702 executing one or more sequences of one or more instructions contained in memory 704. Such instructions, also called software and program code, may be read into memory 704 from another computer-readable medium such as storage device 708. Execution of the sequences of instructions contained in memory 704 causes processor 702 to perform the method steps described herein. In alternative embodiments, hardware, such as application specific integrated circuit 720 and circuits in switching system 730, may be used in place of or in combination with software to implement the invention. Thus, embodiments of the invention are not limited to any specific combination of hardware and software.

The signals transmitted over network link 732 and other networks through communications interfaces such as interface 770, which carry information to and from computer system 700, are exemplary forms of carrier waves. Computer system 700 can send and receive information, including program code, through the networks 780, 790 among others, through network links 732 and communications interfaces such as interface 770. In an example using the Internet 790, a server 792 transmits program code for a particular application, requested by a message sent from computer 700, through Internet 790, ISP equipment 784, local network 780 and network link 732*b* through communications interface in switching system 730. The received code may be executed by processor 702 or switching system 730 as it is received, or may be stored in storage device 708 or other non-volatile storage for later execution, or both. In this manner, computer system 700 may obtain application program code in the form of a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to an infra-red signal, a carrier wave serving as the network link 732*b*. An infrared detector serving as communications interface in switching system 730 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702 or switching system 730.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method at a mobile network node for managing data in a database distributed among a plurality of mobile network nodes in an Internet Protocol (IP) network, comprising the steps of:

receiving, at an original mobile network node in the network, non-routing content data that describes a physical entity in a vicinity of the original mobile network node, wherein the physical entity is not a router or any of the mobile network nodes in the network, and a router in the network directs data packets among mobile network nodes in the network based on at least part of a topology of the network;

in response to receiving the non-routing content data, generating a beacon data object in an object-oriented database distributed among a plurality of the mobile network nodes in the network, the mobile network nodes deployed in a geographical area for supporting operations related to entities within the geographical area, the entities including the physical entity and represented by respective data objects in the object-oriented distributed database, wherein the beacon data object holds the non-routing content data and holds policy data that indicates how to terminate the beacon data object based on a determined state of the physical entity; and causing a mobile network node that has ownership of the beacon data object to perform the step of terminating the beacon data object based on the policy data.

2. A method as recited in claim 1, wherein:

the policy data further indicates how to alert a remote mobile network node different from the mobile network node that has a copy of the beacon data object about the non-routing content data; and the method further comprises causing the mobile network node that has a copy of the beacon data object to perform the step of alerting a remote mobile network node about the non-routing content data based on the policy data.

3. A method as recited in claim 1, further comprising the step of causing the mobile network node that has ownership to perform the step of transferring ownership of the beacon data object to a second mobile network node different from the mobile network node that has ownership.

4. A method as recited in claim 1, further comprising the step of causing the mobile network node that has ownership to perform the step of changing the non-routing content data.

5. A method as recited in claim 1, further comprising the step of associating the beacon data object with a different object in the object oriented database, wherein the different object is associated with the physical entity.

6. A method at a mobile network node for managing data in a database distributed among a plurality of mobile network nodes in an Internet Protocol (IP) network, comprising the steps of:

receiving alert data at the mobile network node in the network from a beacon data object in an object-oriented database distributed among the plurality of mobile network nodes in the network, the mobile network nodes deployed in a geographical area for supporting operations related to entities within the geographical area, the entities represented by respective data objects in the object-oriented distributed database;

wherein the beacon data object holds non-routing content data and holds policy data that indicates how to terminate the beacon data object, the non-routing content data describes a physical entity in a vicinity of an original mobile network node in the network, the physical entity described by the non-routing content data being at least one person in the geographical area, the physical entity is not a router or any of the mobile network nodes in the network and the policy data indicates how to terminate the beacon data object based on a determined state of the physical entity, and each router in the network directs data packets among the mobile network nodes in the network based on at least part of a topology of the network;

in response to receiving the alert data, sending a request to the beacon data object for a data stream based on the non-routing content data from the beacon data object; and in response to sending the request, receiving from the beacon data object a data stream based on the non-routing content data.

7. A method as recited in claim 6, wherein:

the method further comprises the step of determining a particular type of beacon data object from which to receive alerts; and said step of receiving alert data is performed only if a type of the beacon data object that sends the alert is the particular type of beacon data object.

8. A method at a mobile network node for managing data in a database distributed among a plurality of mobile network nodes in an Internet Protocol (IP) network, comprising the steps of:

receiving at a particular mobile network node a copy of a beacon data object in an object-oriented database distributed among a plurality of the mobile network nodes in the network, the mobile network nodes deployed in a geographical area for supporting operations related to entities within the geographical area, the entities including a physical entity and represented by respective data objects in the object-oriented distributed database;

wherein the beacon data object holds non-routing content data and holds policy data that indicates how to terminate the beacon data object and how to alert a remote mobile network node different from the particular mobile network node about the non-routing content data;

the non-routing content data describes the physical entity in a vicinity of an original mobile network node, the physical entity is not a router or any of the mobile network nodes in the network and the policy data indicates how to terminate the beacon data object based on a determined state of the physical entity;

each router in the network directs data packets among mobile network nodes in the network based on at least part of a topology of the network, and the particular mobile network node is different from the original node; and alerting the remote mobile network node about the non-routing content data based on the policy data.

9. A method as recited in claim 8, further comprising receiving ownership of the beacon data object.

10. A method as recited in claim 9, further comprising terminating the beacon data object based on the policy data while the particular mobile network node has ownership of the beacon data object.

11. A method as recited in claim 9, further comprising transferring ownership of the beacon data object to a second mobile network node different from the particular mobile network node while the particular mobile network node has ownership of the beacon data object.

12. A method as recited in claim 9, further comprising changing the non-routing content data while the particular mobile network node has ownership of the beacon data object.

13. An apparatus for managing data in a database distributed among a plurality of mobile network nodes in an Internet Protocol (IP) network, comprising:

means for receiving non-routing content data that describes a physical entity in a vicinity of the apparatus, wherein the physical entity is not a router or any of the mobile network nodes in the network, and a router in the network directs data packets among mobile network nodes in the network based on at least part of a topology of the network, the apparatus implemented as one of the mobile network nodes;

means for generating a beacon data object in an object-oriented database distributed among a plurality of the mobile network nodes in the network in response to receiving the non-routing content data, the mobile network nodes deployed in a geographical area for supporting operations related to entities within the geographical area, the entities including the physical entity and represented by respective data objects in the object-oriented distributed database, wherein the beacon data object holds the non-routing content data and holds policy data that indicates how to terminate the beacon data object based on a determined state of the physical entity; and means for causing a mobile network node that has ownership of the beacon data object to perform the step of terminating the beacon data object based on the policy data.

14. An apparatus for managing data in a database distributed among a plurality of mobile network nodes in an Internet Protocol (IP) network, comprising:

means for receiving alert data from a beacon data object in an object-oriented database distributed among the plurality of mobile network nodes in the network, the apparatus implemented as one of the mobile network nodes, the mobile network nodes deployed in a geographical area for supporting operations related to entities within the geographical area, the entities represented by respective data objects in the object-oriented distributed database;

wherein the beacon data object holds non-routing content data and holds policy data that indicates how to terminate the beacon data object, the non-routing content data describes a physical entity in a vicinity of an original mobile network node in the network, the physical entity described by the non-routing content data being at least one person in the geographical area, the physical entity is not a router or any of the mobile network nodes in the network and the policy data indicates how to terminate the beacon data object based on a determined state of the physical entity, and each router in the network directs data packets among the mobile network nodes in the network based on at least part of a topology of the network;

means for sending a request to the beacon data object for a data stream based on the non-routing content data from the beacon data object in response to receiving the alert data; and means for receiving from the beacon data object a data stream based on the non-routing content data in response to sending the request.

15. An apparatus for managing data in a database distributed among a plurality of mobile network nodes in an Internet Protocol (IP) network, comprising:

means for receiving a copy of a beacon data object in an object-oriented database distributed among a plurality of the mobile network nodes in the network, the apparatus implemented as one of the mobile network nodes, the mobile network nodes deployed in a geographical area for supporting operations related to entities within the geographical area, the entities including a physical entity and represented by respective data objects in the object-oriented distributed database;

wherein:

the beacon data object holds non-routing content data and holds policy data that indicates how to terminate the beacon data object and how to alert a remote mobile network node different from the apparatus about the non-routing content data;

the non-routing content data describes the physical entity in a vicinity of an original mobile network node, the physical entity is not a router or any of the mobile network nodes in the network and the policy data indicates how to terminate the beacon data object based on a determined state of the physical entity;

each router in the network directs data packets among mobile network nodes in the network based on at least part of a topology of the network, and the apparatus is different from the original mobile network node; and means for alerting the remote mobile network node about the non-routing content data based on the policy data.

16. An apparatus for managing data in a database distributed among a plurality of mobile network nodes in an Internet Protocol (IP) network, comprising:

a network interface that is coupled to the network for communicating one or more packet flows therewith;

one or more processors;

one or more computer-readable media; and one or more sequences of instructions carried by the computer-readable media, which, when executed by the one or more processors, cause the one or more processors to carry out the steps of:

receiving non-routing content data that describes a physical entity in a vicinity of the apparatus, wherein the physical entity is not a router or any of the mobile network nodes in the network, and a router in the network directs data packets among mobile network nodes in the network based on at least part of a topology of the network;

in response to receiving the non-routing content data, generating a beacon data object in an object-oriented database distributed among a plurality of the mobile network nodes in the network, the apparatus implemented as one of the mobile network nodes, the mobile network nodes deployed in a geographical area for supporting operations related to entities within the geographical area, the entities including the physical entity and represented by respective data objects in the object-oriented distributed database, wherein the beacon data object holds the non-routing content data and holds policy data that indicates how to terminate the beacon data object based on a determined state of the physical entity; and causing a mobile network node that has ownership of the beacon data object to perform the step of terminating the beacon data object based on the policy data.

17. An apparatus as recited in claim 16, wherein:
the policy data further indicates how to alert a remote mobile network node different from the mobile network node that has a copy of the beacon data object about the non-routing content data; and
execution of the one or more sequences of instructions further causes the one or more processors to carry out the step of causing the mobile network node that has a copy of the beacon data object to perform the step of alerting a remote mobile network node about the non-routing content data based on the policy data.

18. An apparatus as recited in claim 16, wherein execution of the one or more sequences of instructions further causes the one or more processors to carry out the step of causing a mobile network node that has a copy of the beacon data object to perform the step of responding to a request from a remote mobile network node different from the mobile network node that has ownership by sending the non-routing content data to the remote mobile network node.

19. An apparatus as recited in claim 18, said step of responding to a request from the remote mobile network node by sending the non-routing content data to the remote mobile network node further comprising responding to a request for a particular format by performing the steps of:
converting the non-routing content data to converted non-routing content data in the particular format; and
sending the converted non-routing content data to the remote mobile network node.

20. An apparatus as recited in claim 16, wherein execution of the one or more sequences of instructions further causes the one or more processors to carry out the step of causing the mobile network node that has ownership to perform the step of transferring ownership of the beacon data object to a second mobile network node different from the mobile network node that has ownership.

21. An apparatus as recited in claim 16, wherein execution of the one or more sequences of instructions further causes the one or more processors to carry out the step of causing the mobile network node that has ownership to perform the step of changing the non-routing content data.

22. An apparatus as recited in claim 16, wherein:
the network interface is a wireless interface; and
the apparatus is mounted on a mobile platform.

23. An apparatus as recited in claim 16, said step of receiving non-routing content data further comprising receiving human input data that indicates one of a plurality of predefined physical states for one or more physical entities.

24. An apparatus as recited in claim 16, said step of receiving non-routing content data further comprising receiving sensor data that measures one or more properties of the physical entity.

25. An apparatus as recited in claim 16, said step of receiving non-routing content data further comprising receiving operational data that permits operation of one or more functions of the physical entity.

26. An apparatus as recited in claim 25, said step of receiving operational data further comprising receiving credentials for operation of one or more secure functions of the physical entity.

27. An apparatus as recited in claim 16, wherein execution of the one or more sequences of instructions further causes the one or more processors to carry out the step of associating the beacon data object with a different object in the object oriented database, wherein the different object is associated with the physical entity.

28. An apparatus as recited in claim 16, wherein the physical entity associated with the different object is moving.

29. An apparatus as recited in claim 16, said step of terminating the beacon data object based on the policy data further comprising causing the beacon data object to persist indefinitely based on the policy data.

30. An apparatus as recited in claim 16, wherein the non-routing content data indicates a change in state of the physical entity for which a responsive action is desired by a second physical entity associated with a different mobile network node.

31. An apparatus as recited in claim 30, wherein the non-routing content data indicates a change in hazardous environmental conditions at the physical entity.

32. An apparatus as recited in claim 30, wherein the non-routing content data indicates a change in state during a search and rescue operation.

33. An apparatus as recited in claim 30, wherein the non-routing content data indicates a change in security conditions associated with the physical entity.

34. An apparatus for managing data in a database distributed among a plurality of mobile network nodes in an Internet Protocol (IP) network, comprising:
a network interface that is coupled to the network for communicating one or more packet flows therewith;
one or more processors;
one or more computer-readable media; and
one or more sequences of instructions carried by the computer-readable media, which, when executed by the one or more processors, cause the one or more processors to carry out the steps of:
receiving alert data from a beacon data object in an object-oriented database distributed among the plurality of the mobile network nodes in the network, the apparatus implemented as one of the mobile network nodes, the mobile network nodes deployed in a geographical area for supporting operations related to entities within the geographical area, the entities represented by respective data objects in the object-oriented distributed database;
in response to receiving the alert data, sending a request to the beacon data object for a data stream based on non-routing content data in the beacon data object; and in response to sending the request, receiving from the beacon data object a data stream based on the non-routing content data, wherein:

the beacon data object holds the non-routing content data and holds policy data that indicates how to terminate the beacon data object, the non-routing content data describes a physical entity in a vicinity of an original node in the network, the physical entity described by the non-routing content data being at least one person in the geographical area, the physical entity is not a router or any of the mobile network nodes in the network and the policy data indicates how to terminate the beacon data object based on a determined state of the physical entity, and each router in the network directs data packets among mobile network nodes in the network based on at least part of a topology of the network.

35. An apparatus as recited in claim 34, wherein:

execution of the one or more sequences of instructions further causes the one or more processors to carry out the step of determining a particular type of beacon data object from which to receive alerts; and said step of receiving alert data is performed only if a type of the beacon data object that sends the alert is the particular type of beacon data object.

36. An apparatus as recited in claim 34, wherein execution of the one or more sequences of instructions further causes the one or more processors to carry out the step of performing an operation based on the data stream received from the beacon data object.

37. An apparatus for managing data in a database distributed among a plurality of mobile network nodes in an Internet Protocol (IP) network, comprising:

a network interface that is coupled to the network for communicating one or more packet flows therewith;

one or more processors;

one or more computer-readable media; and one or more sequences of instructions carried by the computer-readable media, which, when executed by the one or more processors, cause the one or more processors to carry out the steps of:

receiving a copy of a beacon data object in an object-oriented database distributed among a plurality of the mobile network nodes in the network, the apparatus implemented as one of the mobile network nodes, the mobile network nodes deployed in a geographical area for supporting operations related to entities within the geographical area, the entities including a physical entity and represented by respective data objects in the object-oriented distributed database; and alerting a remote mobile network node about non-routing content data based on policy data in the beacon data object, wherein:

the beacon data object holds the non-routing content data and holds the policy data that indicates how to terminate the beacon data object and how to alert the remote mobile network node different from the apparatus about the non-routing content data;

the non-routing content data describes the physical entity in a vicinity of an original mobile network node, the physical entity is not a router or any of the mobile network nodes in the network and the policy data indicates how to terminate the beacon data object based on a determined state of the physical entity;

each router in the network directs data packets among mobile network nodes in the network based on at least part of a topology of the network, and the apparatus is different from the original mobile network node.

38. An apparatus as recited in claim 37, wherein execution of the one or more sequences of instructions further causes the one or more processors to carry out the step of responding to a request from the remote mobile network node by sending the non-routing content data to the remote mobile network node.

39. An apparatus as recited in claim 38, said step of responding to a request from the remote mobile network node by sending the non-routing content data to the remote mobile network node further comprising responding to a request from the remote mobile network node for a particular format by performing the steps of:

converting the non-routing content data to converted non-routing content data in the particular format; and sending the converted non-routing content data to the remote mobile network node.

40. An apparatus as recited in claim 38, wherein:

the network interface is a wireless interface; and the apparatus is mounted on a mobile platform.

41. An apparatus as recited in claim 37, wherein execution of the one or more sequences of instructions further causes the one or more processors to carry out the step of receiving ownership of the beacon data object.

42. An apparatus as recited in claim 41, wherein execution of the one or more sequences of instructions further causes the one or more processors to carry out the step of terminating the beacon data object based on the policy data while the particular mobile network node has ownership of the beacon data object.

43. An apparatus as recited in claim 41, wherein execution of the one or more sequences of instructions further causes the one or more processors to carry out the step of transferring ownership of the beacon data object to a second mobile network node different from the particular mobile network node while the particular mobile network node has ownership of the beacon data object.

44. An apparatus as recited in claim 41, wherein execution of the one or more sequences of instructions further causes the one or more processors to carry out the step of changing the non-routing content data while the particular mobile network node has ownership of the beacon data object.

* * * * *